US010315307B2

(12) United States Patent
Lee et al.

(10) Patent No.: US 10,315,307 B2
(45) Date of Patent: Jun. 11, 2019

(54) WEARABLE CHAIR ROBOT

(71) Applicant: Hyundai Motor Company, Seoul (KR)

(72) Inventors: Seok Won Lee, Seoul (KR); Dong Han Koo, Seoul (KR)

(73) Assignee: Hyundai Motor Company, Seoul (KR)

( * ) Notice: Subject to any disclaimer, the term of this patent is extended or adjusted under 35 U.S.C. 154(b) by 855 days.

(21) Appl. No.: 14/926,109

(22) Filed: Oct. 29, 2015

(65) Prior Publication Data

US 2017/0008164 A1    Jan. 12, 2017

(30) Foreign Application Priority Data

Jul. 9, 2015  (KR) .................. 10-2015-0097556

(51) Int. Cl.
*A61H 1/02* (2006.01)
*B25J 9/00* (2006.01)
*A47C 9/10* (2006.01)

(52) U.S. Cl.
CPC .............. *B25J 9/0006* (2013.01); *A47C 9/10* (2013.01); *A61H 1/02* (2013.01)

(58) Field of Classification Search
CPC ........ A61H 1/02; A61H 1/0237; A61H 1/024; A61H 1/02444; A61H 1/0255; A61H 1/0262; A61H 2001/0211; A61H 3/00; A61H 3/007; A61H 2003/0107; A61H 2003/0157; A61H 2203/0406; A61H 2203/0418; A61H 2203/0431; A61H 2205/088; A61H 2205/10; A61H 2205/106; A61H 2205/108; B25J 9/0006; A47C 9/10
See application file for complete search history.

(56) References Cited

U.S. PATENT DOCUMENTS

| | | | |
|---|---|---|---|
| 7,544,155 B2 * | 6/2009 | Agrawal | B25J 9/0006 482/69 |
| 8,968,222 B2 * | 3/2015 | Kazerooni | B25J 9/0006 224/265 |
| 9,849,048 B2 * | 12/2017 | Borisoff | A61G 5/14 |

(Continued)

FOREIGN PATENT DOCUMENTS

| | | |
|---|---|---|
| JP | 2012-045194 A | 3/2012 |
| JP | 2013-059491 A | 4/2013 |

(Continued)

*Primary Examiner* — Steven O Douglas
(74) *Attorney, Agent, or Firm* — Mintz Levin Cohn Ferris Glovsky and Popeo, P.C.; Peter F. Corless

(57) ABSTRACT

A wearable chair robot system is provided and includes a first link having a first end hinge-connected to a heel of a user and a second end rotating up and down about the first end distal to a foot of the user, and supported on the ground at a lower limit. The system further includes a second link having a first end hinge-connected to the user above the first end of the first link and a second end that extends distal to the user. A third link has a first end hinge-connected to the second end of the link and a second end hinge-connected to the second end of the first link. Further, a driving unit has a first end hinge-connected to the user above the first end of the second link and a second end extending downward and hinge-connected to the second end of the first link or the third link.

14 Claims, 2 Drawing Sheets

(56) References Cited

U.S. PATENT DOCUMENTS

| | | | |
|---|---|---|---|
| 2006/0241539 A1* | 10/2006 | Agrawal | B25J 9/0006 602/23 |
| 2011/0066088 A1* | 3/2011 | Little | B25J 9/0006 601/35 |
| 2015/0283009 A1* | 10/2015 | Borisoff | A61G 5/14 602/16 |
| 2016/0250093 A1* | 9/2016 | Koren | A61F 2/60 623/30 |
| 2017/0071812 A1* | 3/2017 | Sandler | A61G 5/14 |

FOREIGN PATENT DOCUMENTS

| | | |
|---|---|---|
| JP | 2013-208290 A | 10/2013 |
| KR | 10-1315769 | 10/2013 |
| KR | 10-2014-0064217 | 5/2014 |
| KR | 10-2015-0002133 | 1/2015 |
| KR | 10-1500200 B1 | 3/2015 |

\* cited by examiner

WEARABLE CHAIR ROBOT

CROSS REFERENCE TO RELATED APPLICATION

The present application claims priority to Korean Patent Application No. 10-2015-0097556, filed Jul. 9, 2015, the entire contents of which is incorporated herein for all purposes by this reference.

BACKGROUND

Field of the Invention

The present invention relates to a wearable chair robot device that reduces a load on the knees and ankles, and maintains a stable position when a user maintains a seated posture.

Description of the Related Art

Recently, various types of wearable robots have been actively developed for a multitude of purposes including industrial uses. Technological advancements further enable robots to be used for helping the disabled and the elderly move by assisting muscular strength, or for rehabilitation of patients with a muscular disease. Further, wearable robots am used for users who are required to transport heavy equipment, or heavy loads. Generally, wearable robots are manufactured in shapes that are wearable by organically coupling links that operate similar to joints of a human body. In particular, wearable robots are worn by a user and enable the user to perform high-load work requiring force over the limit of common muscular power of human absent the assistance of specific machines by assisting the muscular force of the arms or legs.

Accordingly, a method of obtaining an assistant force from wearable robots for work requiring force over the limit of muscular force has been proposed. To increase torque to be able to lift a heavy load without increasing force for driving a cylinder by improving the coupling structure of the cylinder and links in wearable robot legs. However, the main purpose of wearable robots of the related art is to perform work with heavy loads and not to maintain a sitting (e.g., stationary position) posture for an extended period of time. Accordingly, the wearable robots are of limited use for users who do not require a substantial force, but work sitting (e.g., stationary positions) for extended periods of time. For example, even in circumstances when robots are available for such users, stability in a sitting posture is generally poor, and therefore the workers are inhibited from maintaining the intended posture for an extended period of time and the robot has limited ability to adapt to various sitting postures of users.

The foregoing is intended merely to aid in the understanding of the background of the invention, and therefore it may contain information that does not form the prior art that is already known in this country to a person of ordinary skill in the art.

SUMMARY

The present invention provides a wearable chair robot that enables a user to maintain a sitting to posture without load on the knees and ankles and to maintain stability even when the user maintains a sitting position with the center of gravity of the sitting posture moved in a safety area. In one aspect of an exemplary embodiment, a wearable chair robot is provided that may include a first link having a first end hinge-connected to a heel of a user and a second end rotating up and down about the first end distal to a foot of the user, and supported on the ground with the foot at a lower limit position. The wearable chair robot may further include a second link having a first end hinge-connected to the user above the first end of the first link and a second end extending distal to the user and a third link having a first end hinge-connected to the second end of the link and a second end hinge-connected to the second end of the first link. A driving unit having a first end hinge-connected to the user above the first end of the second link and a second end extending downward and hinge-connected to the second end of the first link or the second end of the third link may be further included. The first link to may be supported on the ground or actuated in an upward direction by adjusting a length.

In another exemplary embodiment, the wearable chair robot may further include a fourth link positioned parallel to a calf of the user. The wearable chair robot may include, an end hinge that may be connected to the heel of the user or the first end of the first link and a second end hinge-connected to the first end of the second link. In some exemplary embodiments, when the second link is positioned parallel to the ground ahead the foot of the user, the hinge-connection between the user and the second link may be fixed. The length of the driving unit may be adjusted after the hinge-connection between the user and the first end of the second link is fixed, and the fixed hinge-connection between the user and the first end of the second link may be removed. The second end of the second link and the first end of the third link may be positioned directly distal to a user and the hinge-connection between the second end of the second link and the first end of the third link may be fixed.

In other exemplary embodiments, the length of the driving unit may be adjusted after the hinge-connection between the second end of the second link and the first end of the third link is fixed. The fixed hinge-connection between the second end of the second link and the first end of the third link may be removed. In some exemplary embodiments, when the length of the driving unit is minimized, the second end of the first link may contact the ground.

In another aspect of the exemplary embodiments, the wearable chair robot may further include a first support disposed on the backside of user's ankle and having a first end hinge-connected to the heel of the user and a second end hinge-connected to the ankle to support the user. A second support may be disposed on the backside of user's calf and having a first end hinge-connected to a knee of the user and a second end hinge-connected to the ankle to support the user. A third support may be disposed on the backside of user's thigh and having a first end hinge-connected to a buttock of the user and a second end hinge-connected to the knee to support the user. In some exemplary embodiments, the driving unit, may include the first end hinge-connected to a rear side of the third support. Further, the second end may extend downward and may be hinge-connected to the second end of the first link or the second end of the third link. When the first support, the second support, and the third support are positioned in a linear arrangement and, the length of the driving unit may be the greatest.

According to another aspect of the exemplary embodiments, a wearable chair robot system may include a first link having a first end hinge-connected to a heel of a user and a second end rotating (e.g., actuating) up and down about the first end distal to a foot of the user, and may be supported on the ground with the foot at a lower limit position. The wearable robotic chair may further include a second link that may have a first end hinge-connected to the user above the first end of the first link and a second end extending distal to the user. A third link may be included in the wearable robotic chair having a first end hinge-connected to the second end of the link and a second end hinge-connected to the second end of the first link. A driving unit may be included, having a first end hinge-connected to the user above the first end of the second link and a second end extending downward and hinge-connected to the second end of the first link or the second end of the third link. The first link may be supported on the ground or rotated in an upward direction by adjusting a length.

Accordingly, a load on a knee and an ankle in a sitting posture may be reduced by using assistant torque from a driving unit. In particular, the center of gravity may be disposed adjacent to the ground in a sitting posture thereby allowing an improvement in the stability of a user in the sitting posture. Further, a user may be able to make various motions in the robot by improving mobility of the robot that utilizes the links.

BRIEF DESCRIPTION OF THE DRAWINGS

The above and other features of the present disclosure will be apparent from the following detailed description when taken in conjunction with the accompanying drawings, in which.

DETAILED DESCRIPTION

Figure 1:
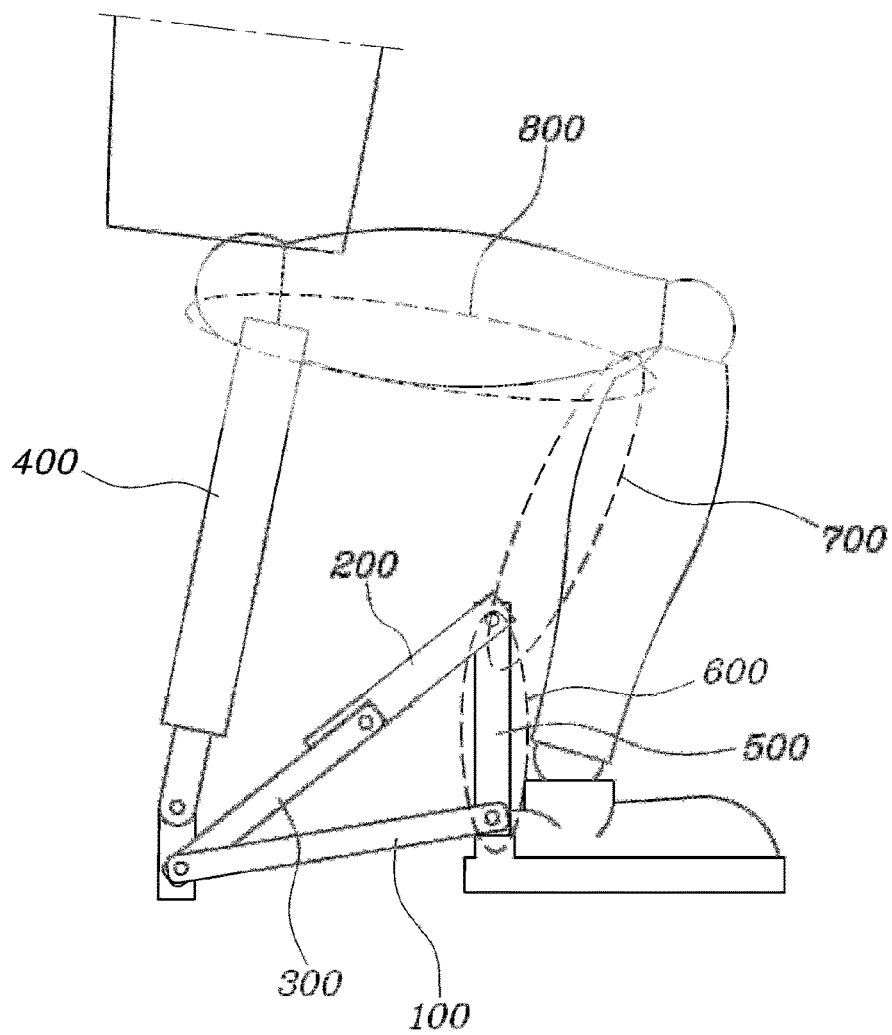
FIG. 1 is an exemplary view showing the configuration of a wearable chair robot in a sitting posture according to an exemplary embodiment of the present invention.

Advantages and features of the invention and methods of accomplishing the same may be understood more readily by reference to the following detailed descriptions of exemplary embodiments and the accompanying drawings. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In an exemplary embodiment, a wearable chair robot may include a first link 100 that may have a first end hinge-connected to a heel of a user and a second end rotating up and down about the first end distal to a foot of the user and may be supported on the ground with the foot at the lower limit position. Further, a second link 200 may have a first end hinge-connected to the user above (e.g., disposed at a higher longitudinal position, a superior position to) the first end of the first link 100 and a second end extending distal to the user. A third link 300 may have a first end hinge-connected to the second end of the link 200 and a second end hinge-connected to the second end of the first link 100. Additionally, a driving unit 400 may have a first end hinge-connected to the user above (e.g., disposed at a higher longitudinal position, a superior position to) the first end of the second link 200 and a second end extending downward and hinge-connected to the second end of the first link 100 or the second end of the third link 300. The first link 100 may be supported on the ground or rotated in an upward direction by adjusting its length.

The driving unit 400 may be configured to apply an assistant force or an assistant torque to a user to minimize (e.g., reduce) load on the user positioned in a standing or seated arrangement. The driving unit of the robot may include various implementations. In an exemplary embodiment, a linear actuator may be used for the driving unit 400 to apply the assistant force or the assistant torque to a user. Typical linear actuators may include a linear motor, a pneumatic cylinder, a hydraulic cylinder, and an Electro Hydraulic Actuator (EHA). A linear actuator may be configured to operate in a linearly arrangement (e.g., in a straight line). For example, a straight motion (e.g., linear movement) may provide improved control and may improve efficiency.

In the exemplary embodiments, as shown in FIG. 1, the driving unit 400 may be a linear actuator and may provide improved control and improved operation efficiency, as described above. Further, as shown in FIG. 1, a single driving unit 400, or a plurality of driving units 400 (not shown) may be used. Increasing the number of the driving units 400, may provide greater assistance force or assistance torque that may be applied to a user. In other words, the performance of the robot may be improved and more precise control may be possible. Conversely, increasing the number of drive units 400 may complicate the control method and may reduce the fuel efficiency of the, therefore selection of the appropriate number of driving units 400 in consideration of both of advantages and disadvantages.

As described above, the driving unit 400 may be rotated limiting the direction to up and down (e.g., vertically or longitudinally) or left and right. In particular, the drive units may preclude accommodating the flexibility of motions in various directions of a user. Accordingly, to accommodate the motions, (a driving unit 400 that may operate non-linear movement is provided). However the efficiency of such a driving unit 400 is minimal, manufacturing is difficult, and control is complicated. Accordingly, an alternate approach capable of flexibly accommodating the motions of a user in addition to using a linear actuator is provided herein further utilizing a link mechanism.

Figure 2:
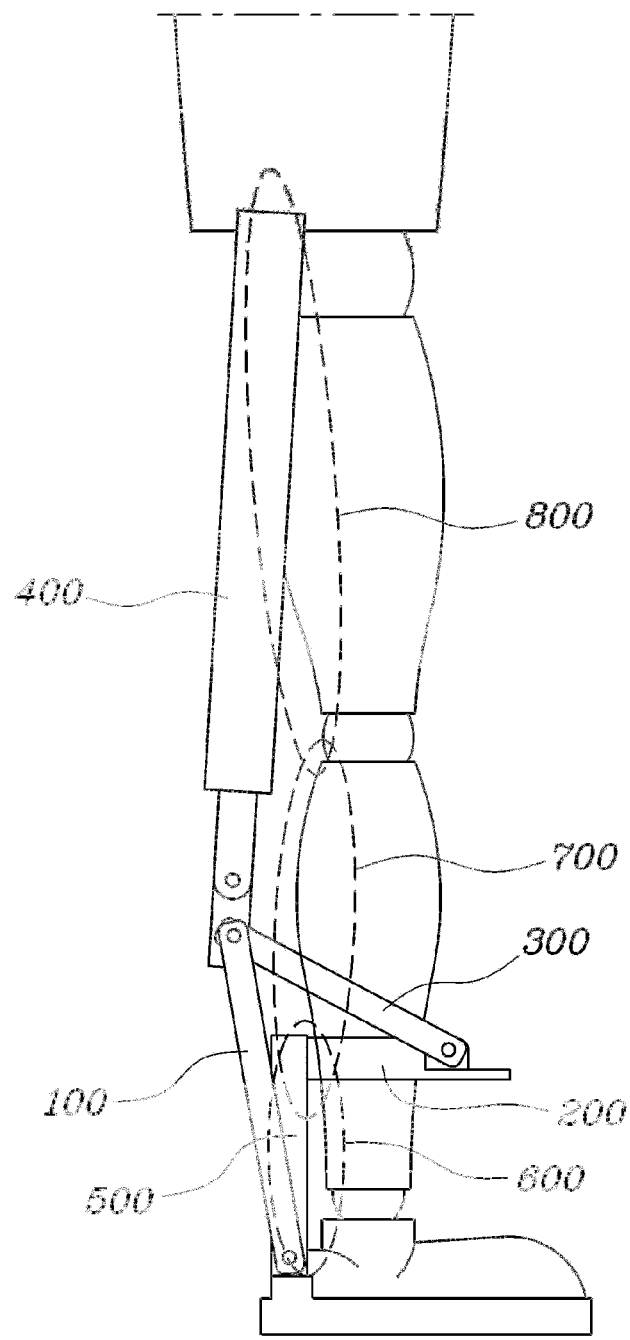
FIG. 2 is an exemplary view showing the configuration of a wearable chair robot in stand-up posture according to an exemplary embodiment of the present invention.

The link mechanism, as shown in FIGS. 1 and 2, may include the first link 100, second link 200, third link 300, and fourth link 500. The links may be hinge-connected to each other and may be freely actuated (e.g., turned, rotated). The driving unit 400 may also be hinge-connected to the second end of the first link 100 or the second link of the third link 300. The driving unit 400 may be configured to freely actuate (e.g., turn, rotate) similar to the links. Additionally, even though the driving unit 400 may be actuated in a linear orientation (e.g., straight), the robot may make various motions by movement of the hinge-connected links.

Further, the related art merely considers with up-down or left-right straight user motions regardless of motions. In an exemplary embodiment, the real time the motions of the links that may be rotated with movement of a user. In particular, in an exemplary embodiment, mobility of the robot using the link mechanism may be improved. Although exemplary embodiments may include three links and four links configurations, the number of links may be increased without a limit to improve the mobility of the robot.

In an exemplary embodiment, the first link 100 may improve the mobility of the robot, as described above. Further, the first link 100 may improve the stability of the robot disposed in a stationary (e.g., a sitting) posture. According to an exemplary embodiment, the driving unit 400 may be maximally contracted, and the second end of the first link 100 may contact the ground. For example, when the driving unit 400 is maximally contracted, the maximum force or the maximum torque may be applied to a user from the driving unit 400, and therefore the maximum force may be applied when the user is in a stationary seated posture. In particular, an increased load is applied to the calves and knees of a user disposed in the sitting posture rather than the stand-up posture. Namely, the driving unit 400 may be configured to apply greater assistant force to the user. As shown in FIG. 1, the length of the driving unit 400, and the second end of the first link 100 may be positioned on the ground since as the second end of the first link 100 is positioned on the ground, the stability of the robot in the stationary (e.g., sitting posture) may be significantly improved.

To maintain the sitting posture the center of gravity of the user may be distributed, for example, even when the robot applies sufficient force is applied to a user, a sitting posture may not be maintained when the user loses their balance (e.g., is unstable). Accordingly to maintain a sitting posture, a stable area of the center of gravity in a sitting position may be ensured, for example, how much area required by a user to maintain a sitting posture may be considered. Generally, the as the contact area of the robotic system on the ground increases, the stable area of the center of gravity of a user also increases when the user is disposed in a sitting posture. Similarly, as the contact area on the ground increases, the stability of the posture also increases. As shown in FIG. 1, when a user is seated, the first link 100 may be disposed on the ground with the sole of a foot also disposed on the ground. For example, the stable area of the center of gravity of the user may increase as much as the length of the first link 100.

Furthermore, the second link 200 and the third link 300 may improve the mobility of the robot, since they may be connected to the driving unit 400. For example, the second end of the second link 200 and the first end of the third link 300 may be arranged in a sustainably straight (e.g., linear) orientation distal to a user, the hinge-connection between the second end of the second link 200 and the first end of the third link 300 may be fixed. Therefore the assistant force applied to the user from the driving unit 400 may decrease and the stability in the sitting posture may improve.

The state of the robot in a sitting posture shown in FIG. 1, may include the second end of the second link 200 and the first end of the third link 300 connected in a linear arrangement (e.g., straight). For example, the hinge-connection of the second link 200 and the third link 300 may be fixed without rotating, to couple the second link 200 and the third link 300 and to operate the links similar to a single link. Additionally, in the sitting posture as shown in FIG. 1, the coupled link composed of the second link 200 and the third link 300 may support the calf of the user with the first link 100 hinge-connected thereto. Therefore, the coupled link composed of the second link 200 and the third link 300 may transmit assistant force for maintaining the sitting posture to the calf and may support the calf of the user with the first link. The stable area of the center of gravity may be increased and the hinge-connected thereto may improve the stability in the sitting posture.

The user may adjust the posture after the hinge-connection between the second end of the second link 200 and the first end of the third link 300 may be fixed into a position. Such an adjustment may not be required to support the calf of the user and the link mechanism may be changed to accommodate to the motion of the user. For example, division of the second link 200 and the third link 300 may coincide with the purpose of the exemplary embodiment. Therefore, the driving unit 400 may be adjusted in length after the hinge-connection between the second end of the second link 200 and the first end of the third link 300 may be fixed, the fixed hinge-connection between the second end of the second link 200 and the first end of the third link 300 may be removed.

Conversely, the second link 200 may be positioned parallel with the ground ahead of the user's foot, and the hinge-connection between the user and the first end of the second link 200 may be fixed. In other words, the second link 200 may be positioned parallel with the ground ahead of the user's foot and the user may be standing, as shown in FIG. 2. In particular, the second link 200 may be fixed and may support the third link 300 hinge-connected to the driving unit 400. Additionally the load on the user positioned in a standing posture may be reduced by not only the first link 100, and the third link 300, thereby improving the efficiency of a motion of the robot.

As described above, when the user adjusts the posture after the hinge-connection between the user and the first end of the second link 200 obtains fixed position, the third link 300 may not require further support and the link mechanism may be adjusted to accommodate to the motion of the user. Additionally, in the exemplary embodiments, the length of the driving unit 400 may be adjusted after the hinge-connection disposed between the user and the first end of the second link 200 obtains a fixed position, the fixed hinge-connection disposed between the user and the first end of the second link 200 may be removed. The fourth link 500 of the link mechanism may be arranged in parallel with the calf of the user. For example, a first end may be hinge-connected to the heel of the user or to the first end of the link 100 and a second end hinge-connected to the first end of the second link 200. The fourth link 500 may improve the mobility of the user, similar to the previously discussed links.

The configuration of the wearable chair robot according to the exemplary embodiments may be achieved through the driving unit 400 and the four-link mechanism composed of four links. The four-link mechanism was described above, but it may include supports that support a user in the form of a wearable chair robot. Additionally, the wearable chair robot may further includes a first support 600 disposed on the backside of user's ankle and having a first end hinge-connected to a heel of the user and a second end hinge-connected to the ankle to support the user. Further, a second support 700 may be disposed on the backside of user's calf and may have a first end hinge-connected to a knee of the user and may have a second end hinge-connected to the ankle to support the user. A third support 800 may be disposed on the backside of user's thigh and may have a first end hinge-connected to a buttock of the user and may have a second end hinge-connected to the knee to support the user.

Moreover, the supports may not be fixed, but may be hinge-connected to the knee and ankle that are joints of the user. Namely, the supports do not limit motions of the user. Various materials (e.g., metals, polymers, or the like) are available to form the supports, provided the materials are in compliance with the indented purpose of the exemplary embodiments. Generally, plastic may be suitable for use due to the weight of the material and the ease of machinability, but the invention is not limited thereto.

As shown in FIGS. 1 and 2, within the driving unit 400, the first end may be hinge-connected to the rear side of the third support 800 and the second end may extend downward and may be hinge-connected to the second end of the first link 100 or the second end of the third link 300. The robot may assist a user in a sitting posture, and the thigh of the user may provide the greatest assist user. Additionally, the thigh of the user transmits the greatest force to the third support 800 that supports the thigh. Therefore, the driving unit 400 may be configured to apply an assistant force and may be hinge-connected to the third support 800. As described above, multiple driving units 400 may be provided, and may allow the assistant force to be applied to the third support 800 in multiple directions. However, in an exemplary embodiment that includes one driving unit 400, the driving unit 400 may be hinge-connected to the portion that corresponds to the buttock of the user, of the third support 800. The portion of the third support 800 where the largest load is applied may include the portion corresponding to the buttock of the user.

As shown in FIG. 2, the first support 600, second support 700, and third support 800 may be positioned in a linear arrangement (e.g., straight line), and the linear arrangement indicates that the user maintains a standing posture. Therefore, the linear arrangement the length of the driving unit 400 is the greatest. Further, the standing posture may not require a substantial assistant force to be applied to the user from the driving unit 400, therefore a minimal force would be applied to the user.

A wearable chair robot system according to the present invention may include a first link 100 that may have a first end hinge-connected to a heel of a user and may have a second end rotating up and down about the first end distal to a foot of the user, and may be supported on the ground with the foot at the lower limit position. The wearable chair robot system may further include second link 200 that may have a first end hinge-connected to the user above the first end of the first link 100 and a second end extending distal to the user. A third link 300 may have a first end hinge-connected to the second end of the link 200 and a second end hinge-connected to the second end of the first link 100. A driving unit 400 may include a first end hinge-connected to the user above the first end of the second link 200 and a second end extending downward and hinge-connected to the second end of the first link 100 or the second end of the third link 300. The first link 100 may be supported on the ground or actuated in an upward direction by adjusting its length.

Although the present invention was described in connection with what is presently considered to be exemplary embodiments thereof. However, it is apparent to those skilled in the art that the exemplary embodiments may be changed and modified in various ways without departing from the spirit and scope of the appended claims. In addition, it is to be considered that all of these modifications and alterations fall within the scope of the present invention.

What is claimed is:

1. A wearable chair robot, comprising:
   a first link having a first end configured to be hinge-connected to a heel of a user and a second end configured to rotate up and down about the first end distal to a foot of the user, the first link being configured to be supported on a ground with the foot disposed at a lower limit position;
   a second link having a first end configured to be hinge-connected to the user above the first end of the first link and a second end configured to extend distal to the user;
   a third link having a first end configured to be hinge-connected to the second end of the link and a second end configured to be hinge-connected to the second end of the first link; and
   a driving unit having a first end configured to be hinge-connected to the user above the first end of the second link and a second end configured to extend downward and to be hinge-connected to the second end of the first link or the second end of the third link, the driving unit being configured to allow the first link to be supported on the ground or rotated in an upward direction by adjusting a length of the driving unit.

2. The wearable chair robot of claim 1, further comprising a fourth link positioned parallel to a calf of the user, with one end configured to be hinge-connected to the heel of the user or the first end of the first link and a second end configured to be hinge-connected to the first end of the second link.

3. The wearable chair robot of claim 1, wherein when the second link is parallel to the ground ahead of the foot of the user, the first end of the second link is further configured such that the hinge-connection between the user and the first end of the second link is fixed.

4. The wearable chair robot of claim 3, wherein when the length of the driving unit is adjusted after the hinge-connection between the user and the first end of the second link is fixed, the first end of the second link is further configured such that the fixed hinge-connection between the user and the first end of the second link is removed.

5. The wearable chair robot of claim 1, wherein when the second end of the second link and the first end of the third link have a linear arrangement distal to a user, the second end of the second link is further configured such that the hinge-connection between the second end of the second link and the first end of the third link is fixed.

6. The wearable chair robot of claim 5, wherein when the length of the driving unit is adjusted after the hinge-connection between the second end of the second link and the first end of the third link is fixed, the second end of the second link is further configured such that the fixed hinge-connection between the second end of the second link and the first end of the third link is removed.

7. The wearable chair robot of claim 1, wherein when the length of the driving unit is minimized, the second end of the first link is further configured to come in contact with the ground.

8. The wearable chair robot of claim 1, further comprising:
   a first support configured to be disposed on a backside of an ankle of the user and having a first end configured to be hinge-connected to the heel of the user and a second end configured to be hinge-connected to the ankle to support the user;
   a second support configured to be disposed on a backside of a calf of the user and having a first end configured to be hinge-connected to a knee of the user and a second end configured to be hinge-connected to the ankle to support the user; and
   a third support configured to be disposed on a backside of a thigh of the user and having a first end configured to be hinge-connected to a buttock of the user and a second end configured to be hinge-connected to the knee to support the user.

9. The wearable chair robot of claim 6, wherein in the driving unit, the first end is further configured to be hinge-connected to a rear side of the third support and the second end is further configured to extend downward and to be hinge-connected to the second end of the first link or the second end of the third link.

10. The wearable chair robot of claim 5, wherein when the first support, the second support, and the third support are positioned in a linear arrangement, the driving unit is configured such that the length of the driving unit is largest.

11. A wearable chair robot system comprising:
    a first link having a first end configured to be hinge-connected to a heel of a user and a second end configured to rotate up and down about the first end distal to a foot of the user, the first link being configured to be supported on a ground with the foot at a lower limit position;
    a second link having a first end configured to be hinge-connected to the user above the first end of the first link and a second end configured to extend distal to the user;
    a third link having a first end configured to be hinge-connected to the second end of the link and a second end configured to be hinge-connected to the second end of the first link; and
    a driving unit having a first end configured to be hinge-connected to the user above the first end of the second link and a second end configured to extend downward and to be hinge-connected to the second end of the first link or the second end of the third link, the driving unit configured to allow the first link to be supported on the ground or rotated in an upward direction by adjusting a length of the driving unit.

12. The wearable chair robot system of claim 11, further comprising:
    a fourth link configured to be positioned parallel to a calf of the user, with one end configured to be hinge-connected to the heel of the user or the first end of the first link and a second end configured to be hinge-connected to the first end of the second link.

13. A method of controlling wearable chair robot, comprising:
    vertically rotating up and down a first link having a first end configured to be hinge-connected to a heel of a user and a second end configured to rotate about the first end distal to a foot of the user, the first link being configured to be supported on a ground with the foot disposed at a lower limit position;
    connecting a second link having a first end configured to be hinge-connected to the user above the first end of the first link and a second end configured to extend distal to the user;
    connecting a third link having a first end configured to be hinge-connected to the second end of the link and a second end configured to be hinge-connected to the second end of the first link; and
    adjusting a length of a driving unit having a first end configured to be hinge-connected to the user above the first end of the second link and a second end configured to extend downward and to be hinge-connected to the second end of the first link or the second end of the third link by supporting the first link on the ground or rotating the first link in an upward direction.

14. The method of claim 13, further comprising:
    positioning a fourth link parallel to a calf of the user, with one end configured to be hinge-connected to the heel of the user or the first end of the first link and a second end configured to be hinge-connected to the first end of the second link.

* * * * *